United States Patent
Wallmeier et al.

(10) Patent No.: US 9,702,422 B2
(45) Date of Patent: *Jul. 11, 2017

(54) BRAKE SHOE FOR A DRUM BRAKE

(71) Applicant: SAF-HOLLAND, GmbH, Bessenbach (DE)

(72) Inventors: Stefan Wallmeier, Goldbach (DE); Michael Roos, Marktheidenfeld (DE)

(73) Assignee: SAF-HOLLAND GmbH, Bessenbach (DE)

( * ) Notice: Subject to any disclaimer, the term of this patent is extended or adjusted under 35 U.S.C. 154(b) by 230 days.

This patent is subject to a terminal disclaimer.

(21) Appl. No.: 14/160,064

(22) Filed: Jan. 21, 2014

(65) Prior Publication Data

US 2014/0202806 A1    Jul. 24, 2014

(30) Foreign Application Priority Data

Jan. 24, 2013   (DE) .................. 10 2013 201 111

(51) Int. Cl.
  *F16D 65/08*  (2006.01)
  *F16D 51/16*  (2006.01)
  *F16D 69/00*  (2006.01)

(52) U.S. Cl.
  CPC .............. *F16D 65/08* (2013.01); *F16D 51/16* (2013.01); *F16D 2069/002* (2013.01)

(58) Field of Classification Search
  CPC .......... F16D 65/08; F16D 51/17; F16D 51/18; F16D 2069/002
  See application file for complete search history.

(56) References Cited

U.S. PATENT DOCUMENTS

| | | | |
|---|---|---|---|
| 1,724,114 A | | 8/1929 | Stoner |
| 1,896,452 A | * | 2/1933 | Loughead ............... F16D 51/24 188/250 E |
| 1,937,891 A | | 12/1933 | Hunt |
| 1,982,403 A | | 11/1934 | Sneed |
| 2,667,948 A | * | 2/1954 | Tilden ................. F16D 65/0006 188/234 |
| 2,723,016 A | | 11/1955 | Goldberg |
| 2,818,944 A | | 1/1958 | Barany |
| 2,993,577 A | * | 7/1961 | Goldberg ............... F16D 13/18 188/259 |
| 3,007,549 A | * | 11/1961 | Klein ...................... F16D 65/08 188/251 R |
| 3,412,835 A | | 11/1968 | Goldberg |
| 3,894,620 A | * | 7/1975 | Goldberg ............... F16D 13/18 188/250 A |

(Continued)

FOREIGN PATENT DOCUMENTS

| | | |
|---|---|---|
| CN | 87 1 03935 | 12/1987 |
| DE | 19840065 | 3/2000 |

(Continued)

*Primary Examiner* — Bradley King
(74) *Attorney, Agent, or Firm* — Price Heneveld LLP (57) ABSTRACT

The invention relates to a brake shoe for a drum brake and a drum brake that comprises a supporting unit and a lining unit, wherein the supporting unit comprises a bearing portion for pivotable support and an actuation portion, wherein the supporting unit comprises two supporting portions, wherein the center of the mean curvature of the first supporting portion is spaced apart from the center of the mean curvature of the second supporting portion.

19 Claims, 4 Drawing Sheets (56) References Cited

U.S. PATENT DOCUMENTS

2013/0126283 A1* 5/2013 Papp .................. F16D 51/32
  188/335

FOREIGN PATENT DOCUMENTS

| | | |
|---|---|---|
| DE | 102010021393 | 12/2011 |
| GB | 933433 | 9/1955 |
| JP | H08-210395 | 8/1996 |

* cited by examiner

BRAKE SHOE FOR A DRUM BRAKE

BACKGROUND OF THE INVENTION

The present invention relates to drum brakes and in particular to a brake shoe for such drum brakes.

Drum brake systems are well known in the prior art, wherein a brake drum permanently connected to the vehicle wheel is braked by brake shoes, which are pushed against the cylinder-shaped inner surface of the brake drum. When designing such drum brake systems, there are always conflicting goals regarding the different "outer" characteristics of the drum brake. The brake efficiency, for example, may be increased only at the expense of a reduced service life of the drum brake, or the general performance of the brake or the maximum braking torque, for example, may only be increased by enlarging the entire drum brake and it has to be accepted that the weight and the required building space will increase. Thus, the potential for development in particular of the design of the brake shoes for drum brakes with regard to a specific wear on certain portions of the brake shoe or a multi-stage brake characteristic, for example, is by no means exhausted and there is a corresponding need for further developments.

SUMMARY OF THE INVENTION

The object underlying the present invention is to provide a drum brake and a brake shoe for a drum brake, wherein in particular the signs of wear are optimized depending on the operational behavior of the drum brake, and the brake behavior of the drum brake may be adjusted to different requirements during the operation of the drum brake.

According to the invention, a brake shoe for a drum brake comprises a supporting unit, wherein the supporting unit comprises a bearing portion for pivotable support and an actuation portion, wherein the supporting portion between the bearing portion and the actuation portion comprises a first supporting portion, which is designed such that it is curved, and a second supporting portion, which is designed such that it is curved, and wherein the center of the mean curvature of the first supporting portion is spaced apart from the center of the mean curvature of the second supporting portion. The supporting unit is preferably a curved body, which is pivotably arranged in a bearing portion, wherein an actuation portion is provided essentially opposite the bearing portion or at the distal end of the supporting unit, which end is opposite the bearing portion. The actuation portion serves in particular for absorbing an actuation force applied by a brake cylinder or an extension wedge device, for example, and for transmitting said actuation force to the supporting unit. The brake shoe according to the invention is preferably arranged within a brake drum, wherein, when an actuation force is applied to the actuation portion, the brake shoe is preferably swiveled or pivoted such that at the inner surface of the brake drum it comes into a friction contact with said inner surface of the brake drum. According to the invention, the supporting unit has a curvature, which changes or is not constant along the extension thereof between the bearing portion and the actuation portion. Line of curvature of the curvature in this context is a line lying in the surface of the supporting unit facing convexly towards the outside, which line is preferably circle-like. The line of curvature may be a precise segment of a circular arc or, deviating slightly therefrom, also be elliptical. A supporting portion of the supporting unit according to the invention has a mean curvature, which averages an actually varying curvature of the line of curvature of the supporting portion to a circle segment. Said circle segment of the mean curvature has a center, which according to the invention is spaced apart from the center of the mean curvature of the second supporting portion. Preferably in this design, when the brake shoe is pivoted about the bearing portion, a lining unit provided at the convex outer surface of the supporting unit, at first in the area of the first supporting portion and then also in the area of the second supporting portion, comes into contact with a brake drum, which is preferably formed circular. Thus, it is possible to achieve with relatively small constructive outlay, with one and the same brake shoe, different brake characteristics for a partial-load brake action or a brake action performed with only 50% of the actuation force, for example, and, at the same time, to achieve also certain brake characteristics for a full brake application, i.e. a brake action with full actuation force. As a matter of course, by adjusting the bending stiffness of the supporting unit in different cross-sections along the line of curvature of the supporting unit, it is also possible to preferably adjust a plurality of operating points with brake characteristics, which are preferred for the respective operating points. In this context, as brake characteristics there is defined in particular the behavior of the brake shoe preferably in interaction with the surrounding brake drum when a certain actuation force is applied to the actuation portion of the brake shoe. Here, the actuation force may be understood as the input, and the braking effect caused thereupon by the brake shoe as the finally desired output of the brake system according to the invention. Preferably, the brake shoe has a non-linear brake characteristic, i.e. for a linearly increasing actuation force, the increase in the braking effect is non-linear. The actuation force causes the brake shoe to rest against a brake drum, which is preferably provided, and bends or deforms the brake shoe or the supporting unit of the brake shoe. In the sense of the present invention, any deformation or deflection is to be in the elastic range, i.e. entirely resettable. Further output values of the brake system are the wear on the brake shoe and the development of heat caused by the brake shoe. In order to achieve a desired braking effect for a certain actuation force, there has to be preferably provided a desired combination of the parameters friction surface between the brake shoe and the brake drum, coefficient of friction of the friction pairing between the brake shoe and the brake drum, and contact force at the drum of the surface of the brake shoe being in friction with the drum. These three factors form part of the brake factor $c^*$, which may also be understood as the "sum of all inner properties" of the drum brake. Thus, it is possible, by designing the curvature of the supporting unit and at the lining unit fixable thereto according to the invention, to achieve for certain actuation forces the respective desired brake factor $c^*$.

Advantageously, the distance of the centers relative to each other is in a relationship of 0.01 to 0.15, preferably 0.03 to 0.1, and particularly preferably 0.05 to 0.07 to a mean radius of curvature of the first supporting portion. The displacement of the centers of the mean radiuses of curvature of the first and second supporting portions preferably causes the supporting unit to have no linearly continuous curvature in its outer contour. The result of such design is that a portion of a lining unit connected to the first supporting portion shows at first a braking effect, while a lining portion fixed to the second supporting portion shows a braking effect only when the supporting unit has been sufficiently deformed by an actuation force. The displacement of the centers relative to each other in relation to the mean radius of curvature of the first supporting portion is a measure as to what extent the curvature of the second supporting portion deviates from the curvature of the first supporting portion. The greater the distance between the two centers, the greater the deformation of the supporting unit, which is required so that the second lining portion shows a braking effect. Selecting a certain relationship of the distance of the centers of the mean curvatures of the supporting portions to the mean radius of curvature thus makes it possible to determine a degree of deformation of the supporting unit of the brake shoe, which is to be required so that selected lining portions of the brake shoe come into contact with the brake drum, which is preferably provided. Thus, the brake characteristic may be adjusted by means of this preferred relationship. The upper limit of 0.15 of the preferred range of relationship is given by the material of the supporting unit, which is to be deformed elastically so that there are no permanent deformations of the brake shoe, which would change the brake characteristic.

Further preferably, the first supporting portion spans a first angle of the arc or radian about the center of the mean curvature thereof, and the second supporting portion spans a second angle of the arc about the center of the mean curvature thereof, wherein the relationship of the first angle of the arc to the second angle of the arc is in a range of 0.5 to 3, preferably 0.7 to 2, and particularly preferably about 0.9 to 1.3. The angle of the arc spanned by a supporting portion is an expression for its extension along the line of curvature, wherein the angle of the arc remains the same even if the brake shoe is scaled up or down and, thus, remains a measure, which has the same expressiveness for differently dimensioned brake shoes. Depending on the operational states of the brake shoe to be expected and the expected mean duration thereof over the service life of the brake shoe, it is possible to effectively dimension and design the distribution of the overall available brake lining surface to the first and second supporting portions by means of a certain relationship of the angles of the arc. If, for example, for partial brake actions a relatively large surface of the lining unit is to cause a braking effect, the first lining portion fixed to the first supporting portion is preferably dimensioned larger than the second lining portion, and the relationship of the angles of the arc is preferably in a range of 1.3 to 3. In order to considerably increase the brake lining surface causing a braking effect when an actuation force amounting to between 80 and 100% of the maximum actuation force, for example, is applied, it is preferred to dimension and design the second lining portion larger than the first lining portion, and the relationship of the angles of the arc is preferably between 0.5 and 0.9.

According to a preferred embodiment of the invention, in the decompressed or relaxed state of the brake shoe, the mean radius of curvature of the first supporting portion to a mean radius of curvature of the second supporting portion is in a relationship of 0.8 to 0.99, preferably 0.85 to 0.95, and particularly preferably about 0.88 to 0.92. Apart from the displacement of the centers of the mean curvature of the supporting portions relative to each other, it is also possible to differently dimension and design the mean radius of curvature of the supporting portions so as to purposefully influence the brake characteristic of the brake shoe. As a matter of course, when an actuation force is applied to a brake shoe according to the invention, which is arranged in a brake drum, the supporting unit is elastically deformed to a certain degree, in particular such that the mean radius of curvature of both supporting portions increases. Preferably, when no actuation force is applied, the mean radius of curvature of the second supporting portion is smaller than that of the first supporting portion, wherein the second supporting portion is preferably deformed only when an almost maximum actuation force is applied such that the actuation portion fixed to the supporting portion causes a braking effect completely, i.e. with its entire friction surface. The smaller the relationship of the mean radiuses of curvature, the greater the required deformation of the second supporting portion so that, when the full actuation force is applied, the same mean radius of curvature as the first supporting portion is achieved. The lower limit of the preferred range of relationship is accordingly given by the potential for elastic deformation of the manufacturing material.

Advantageously, a lining unit may be fixed to the supporting unit at the convexly curved outer side thereof, wherein, when an actuation force is applied to the actuation portion, which force is less than a limiting force, the lining unit has a braking effect in a first lining portion only, wherein, when an actuation force larger than the limiting force is applied, the lining unit has a braking effect in a second lining portion as well. To put it differently, when a first actuation force is applied to the supporting unit, the lining unit comes into a friction pairing with the brake drum in a first lining portion only. When the actuation force is increased and finally exceeds the limiting force mentioned above, it is preferred that the lining unit has a braking effect in a second lining portion as well or comes into friction with the brake drum. Thus, it is possible to achieve a two-stage and, preferably, a multi-stage brake characteristic of the brake shoe, depending on the actuation force applied. Here, it is preferred that there are actuation forces smaller than the limiting force in particular in the case of partial brake actions, which do not require the maximum possible brake force of the drum brake. Actuation forces above the limiting force are preferred in order to perform a full brake application, wherein the brake shoe achieves a braking effect or comes into a friction pairing with the brake drum preferably with all lining portions of the lining unit.

Preferably, the first lining portion has a larger thickness than the second lining portion. During the operation of the drum brake, there are usually more partial brake actions than full brake applications. With regard to the brake shoe of the invention this means that the first lining portion is subject to more stress, i.e. causes the braking effect or comes into friction with the brake drum more often than the second lining portion. Consequently, it is preferred to form the first lining portion with a larger thickness than the second lining portion, wherein it is in this way possible to allow for a higher wear on the first lining portion so that both lining portions come to the end of their service life at approximately the same time. For a plurality of lining portions it is preferred to scale the thicknesses of the respective lining portions accordingly, depending on the stresses to be expected during use.

Particularly preferably, the first lining portion has a first thickness and the second lining portion has a second thickness, wherein the first thickness is preferably in a relationship of 1.05 to 4, more preferably 1.2 to 2, and particularly preferably about 1.5 to the second thickness. In order to easily design the drum brake, a relationship of the thicknesses of 4 is the highest possible relationship of the thickness of the first lining portion to the thickness of the second lining portion. In particular, in case the first lining portion is worn by a value of great thickness, it is necessary that the brake shoe is intelligently guided within the drum brake so that with increasing wear on the brake shoe or the first lining portion the general brake characteristics of the brake shoe will not change undesirably. By designing the first and second lining portions with a preferred relationship of the thicknesses it is possible to adjust the brake shoe of the invention to certain use profiles of the motor vehicle. To put it differently, this means that, for example departing from a certain relationship of the partial brake actions to be expected in use to the full brake applications to be expected in use, the thickness of the first lining portion is preferably put into a corresponding relationship to the thickness of the second lining portion so that the two lining portions achieve their service life limit at approximately the same time. Thus, advantageously, the wear on the brake shoe is optimized for the overall service life thereof.

In a preferred embodiment, the first lining portion is made from a material of higher abrasion resistance than the second lining portion. This is advantageous since according to expectations the first lining portion more often causes a braking effect than the second lining portion. Thus, it is again possible to adjust the wear on the first lining portion relative to the second lining portion such that both lining portions experience their maximum wear at approximately the same time. The relationship of the abrasion resistance is preferably adjusted depending on the use profile of the brake shoe to the expected during use in the motor vehicle.

Preferably, the second lining portion is made from a material having a higher coefficient of friction than the first lining portion. Since the second lining portion is preferably used in full brake applications, it is advantageous that the brake shoe generates a maximum brake force during such full brake applications. For this reason, the second lining portion is advantageously made from a material having a higher coefficient of friction than the first lining portion. Usually, the wear on a material having a higher coefficient of friction is larger than the wear on a material having a lower coefficient of friction, wherein, for this reason, it is preferred to form the first lining portion from a material having a lower coefficient of friction, which is thus subject to less wear than the second lining portion.

Preferably, the coefficient of friction of the second lining portion is 1.1 to 1.3 times, more preferably 1.15 to 2 times, and particularly preferably 1.3 to 1.7 times the coefficient of friction of the first lining portion. Depending on the use profile, which is expected for the brake shoe during the operation in the motor vehicle, it may be preferred to form the second lining portion from a material having a considerably higher or only slightly higher coefficient of friction. For example, the material of the second lining material may have three times the coefficient of friction of the material of the first lining portion so as to achieve a considerably increased overall coefficient of friction or mean coefficient of friction of the entire brake shoe or of the entire lining unit in the case of a full brake application. On the other hand, it may also be preferred that the second lining portion is made from a material having only a slightly higher coefficient of friction than the first lining portion if, for example, a relatively large number of full brake applications relative to the partial brake actions has to be expected.

Preferably, the lining unit comprises more than two lining portions in order to achieve a brake characteristic of the brake shoe with more than two stages. Designing the brake shoe or the lining unit in this way makes it preferably possible to realize a multi-stage brake characteristic so as to realize certain brake properties of the brake shoe, for example, when the brake is actuated at half of the actuation force, at three quarters of the actuation force and at maximum actuation force.

Advantageously, the supporting unit comprises a web plate and a lining plate, wherein the web plate and/or the lining plate have/has a material thickness or material gauge, which increases from the bearing portion towards the actuation portion. Particularly preferably, the web plate is aligned essentially orthogonally relative to the lining plate and advantageously it is attached centrally at the lining plate. To put it differently, the supporting unit has a T-shaped cross-section. As the material gauge of the web plate and/or of the lining plate increases, essentially also the area moment of inertia increases, wherein the bending stiffness of the supporting unit increases while the modulus of elasticity remains the same. Further preferably, there may be provided a plurality of web plates, which are each attached orthogonally at the lining plate. In particular, when the web plate and/or the lining plate are/is designed as rolled plate(s), it is particularly easy to achieve already during the manufacturing process an evenly increasing or decreasing material thickness, wherein the lining plate and the web plate are then joined together preferably by means of a welding process to form the supporting unit. Apart from the material gauge of the plates, it may also be preferred that, while the plate thickness or gauge remains the same, the area moment of inertia nevertheless increases in the course of the line of curvature, for example by increasing the cross-section of the web plate and/or of the lining plate. This may be achieved, for example, by increasing the web height, i.e. the extension of the web plate orthogonally relative to the lining plate, in the course of the line of curvature.

In a preferred embodiment, the supporting unit has at least one local material weakness, which reduces the bending stiffness of the supporting unit. As a local material weakness, there is used particularly preferably a recess or a cavity in the supporting unit, which purposefully at a certain point in the course along the line of curvature reduces the area moment of inertia of the supporting unit and, thus, the bending stiffness locally in this point. Particularly preferably, the local material weakness is provided in the web plate. By means of the local material weakness it is possible to purposefully form an area on the supporting unit, in which it bends more readily than in the other areas outside of the material weakness. For example, by providing a local material weakness approximately centrally on the supporting unit, i.e. centrally with respect to the course of the line of curvature, the supporting unit is divided into two parts, which preferably are pivotable relative to each other in the area of the local material weakness by bending the supporting unit. As a matter of course, in order to exert an influence on the bending stiffness of the brake shoe, it is also possible to provide local material reinforcements. For example, cross webs or lengthwise webs may be welded or bolted to the supporting unit in order to reinforce the brake shoe in certain areas, i.e. in order to increase the bending stiffness thereof.

According to a preferred embodiment, the actuation portion comprises a first engagement portion and a second engagement portion, wherein the first engagement portion is designed to transmit an actuation force smaller than the limiting force to the supporting unit, and wherein the second engagement portion is designed to transmit an actuation force larger than the limiting force to the supporting unit. The actuation portion is advantageously that portion of the brake shoe, where a force is transmitted to the brake shoe, which pushes the brake shoe against the inside of the brake drum. Advantageously, the actuation portion has a material reinforcement and/or a surface quality, which particularly well withstands friction and Hertzian stress or surface pressure. Preferably, the actuation portion is adapted for the force input from an S-cam or an extension wedge device or a hydraulically driven piston arrangement. By pivoting or swiveling the brake shoe about the bearing portion, preferably also the actual point of transmission between the force-applying actuation means and the actuation portion of the brake shoe shifts. Accordingly, applying a small actuation force will result in a relatively small pivoting movement of the brake shoe in the bearing portion and, preferably, the actuation means will engage the first engagement portion of the actuation portion and, when a larger actuation force is applied, which exceeds the brake force and causes an accordingly greater pivoting movement of the brake shoe, the engagement means will engage the second engagement portion of the actuation portion.

Particularly preferably, the first engagement portion is adapted to transmit the actuation force to the supporting unit with a force component in the direction of the first lining portion. Thus, preferably, when an actuation force, which is smaller than the limiting force, is applied, the first engagement portion is adapted such the actuation force is transmitted to the supporting unit with a force component pointing in the direction of the first lining portion. Preferably, the first engagement portion is diagonal or not perpendicular relative to the main direction of the actuation force so that the force transmitted to the supporting unit has at least one component in the direction of the first lining portion. Consequently, the first lining portion is pushed against the inside of the brake drum with a larger force acting in the radial direction of the curvature. Preferably, the first engagement portion is designed as an essentially planar surface, which is engaged by the actuation means of the brake arrangement of the drum brake. Further preferably, the second engagement portion is also designed as a planar or flat contact surface for the actuation means, wherein the second engagement portion is directed such that it is pivoted relative to the first engagement portion. To put it differently, the actuation portion of the brake shoe has a preferably roof-shaped or reverse V-shaped geometry, wherein the leg of the reverse V directed towards the inside or towards the bearing portion forms the first engagement portion and the leg of the V facing the outside or away from the bearing portion forms the second engagement portion.

Further according to the invention, there is provided a drum brake, comprising a brake drum and a brake shoe having a lining unit, wherein, in the first state of the drum brake, the lining unit comes into engagement with the brake drum with a first lining portion only, and wherein, in a second state of the drum brake, the lining unit comes into engagement with the brake drum with the first lining portion and with a second lining portion. Preferably, the drum brake is in its first state when there is a partial braking or partial brake action, i.e. a braking at an actuation force smaller than the maximum force available for the drum brake. The second state is preferably characterized in that the maximum actuation force is applied in order to cause the lining unit to rest against the brake drum as fully as is possible, i.e. with the maximum possible friction surface. As a matter of course, it is preferred that the drum brake has two opposing brake shoes. It is further preferred that in the normal operation of the drum brake, the brake shoe is arranged in the drum brake such that the brake drum rotates relative to the brake shoe in the direction of that end of the brake shoe, at which the brake shoe is pivotably mounted. When the brake drum rotates in this direction and the brake shoe and the brake drum come into engagement with each other, the so-called self-servo or self-energizing effect occurs, wherein the brake force acting along the circumference of the curvature of the brake shoe at the same time increases the contact pressure of the brake shoe or of the lining unit of the brake shoe against the brake drum.

Preferably, an actuation force is applied at the brake shoe in order to push the brake shoe against the brake drum, wherein the first state is characterized in that the actuation force does not exceed a limiting force, and wherein the second state is characterized in that the actuation force is larger than the limiting force. Preferably, it depends on the actuation force, which is applied to the drum brake, whether the drum brake comes into the first state or into the second state. To put it differently, the user of the drum brake, by means of the actuation force which he applies, determines whether he carries out a partial braking, i.e. a braking in a first state, or a full brake application, i.e. a braking in the second state. By designing the brake shoe according to the invention, in particular by varying the bending stiffness of the supporting unit as it has been described above, it may be advantageously achieved that the drum brake has a certain brake characteristic depending on the actuation force applied.

As a matter of course, the further features and advantages of the brake shoe according to the invention may also be used in the drum brake according to the invention.

Further advantages and features of the present invention result from the following description with reference to the appended Figures. As a matter of course, features shown in connection with a particular embodiment may also be combined with features of other embodiments.

DETAILED DESCRIPTION OF THE PREFERRED EMBODIMENTS

Figure 1:
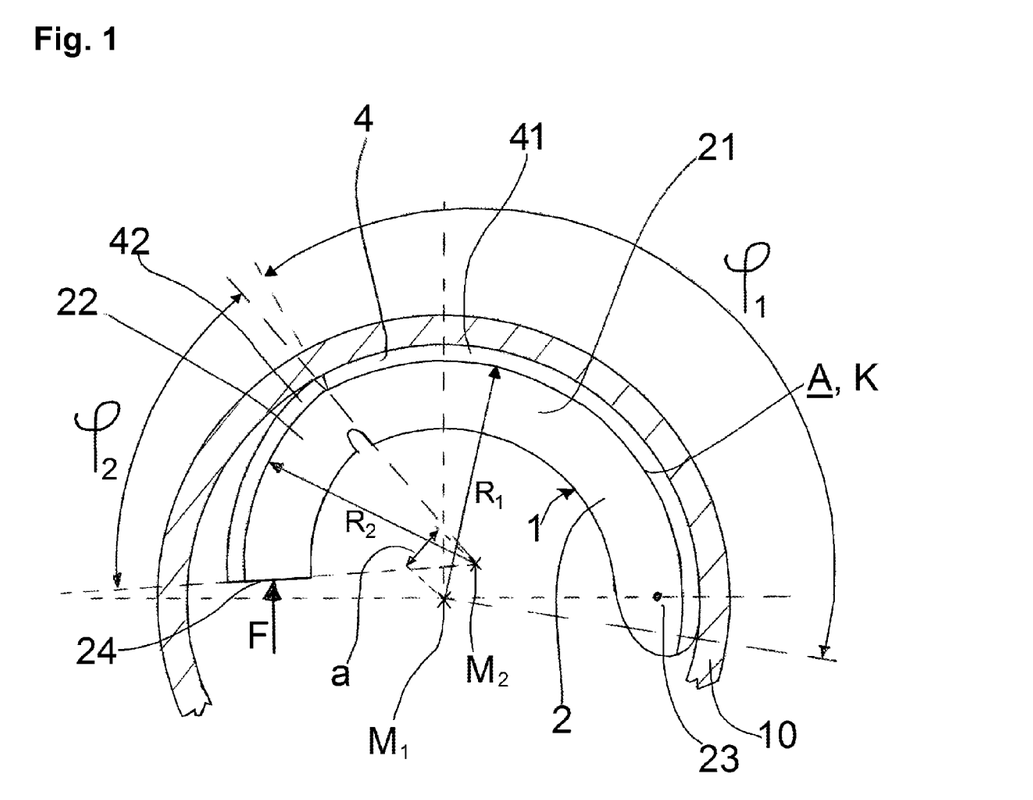
FIG. 1 a view of the drum brake of the invention in its first state.

FIG. 1 shows a partially sectional view of the drum brake according to the invention in its first state. The drum brake has a brake drum 10 and a brake shoe 1, wherein the brake shoe 1 comprises a supporting unit 2 and a lining unit 4. The supporting unit 2 is a curved component, wherein the lining unit 4 is fixed at the convex outer surface A. Furthermore, the line of curvature K, in the outer surface A, runs between the bearing portion 23 and the actuation portion 24 of the supporting unit 2. The supporting unit 2 comprises a first supporting portion 21, which preferably is arranged adjacent to the bearing portion 23, and a second supporting portion 22, which preferably is arranged adjacent to the actuation portion 24. Alternatively preferably, it is possible to provide a plurality of supporting portions between the bearing portion 23 and the actuation portion 24. According to the invention, it is provided that the first supporting portion 21 has a curvature with a mean radius of curvature $R_1$, wherein the mean radius of curvature $R_1$ spans a circle segment with a first angle of the arc $\phi_1$. Analogously, the second supporting portion 22 has a curvature with a mean radius of curvature $R_2$, wherein the mean radius of curvature $R_2$ spans a circle segment with a second angle of the arc $\phi_2$. Preferably, the relationship of the first angle of the arc $\phi_1$ to the second angle of the arc $\phi_2$ is 0.5 to 3, wherein the Figure shows a particularly preferred range of 2 to 2.6. The center $M_1$ of the mean curvature of the first supporting portion 21 is spaced apart from the center $M_2$ of the mean radius of curvature of the second supporting portion 22 by a distance a. By differently curving the first and second supporting portions 21, 22 according to the invention it is achieved that the lining unit 4 comes into friction contact with the brake drum 10 at first only with its first lining portion 41 in the area of the first supporting portion 21, and only after the supporting unit 2 has been deflected or bent, also with the second lining portion 42 in the area of the second supporting portion 22 (cf. FIG. 2). Preferably, this behavior of the brake shoe 1 is supported and reinforced also by a bending stiffness of the supporting unit 2 varying between the bearing portion 23 and the actuation portion 24. In the Figure, there is shown the mean radius of curvature $R_1$ of the curvature of the first supporting portion 21 and the mean radius of curvature $R_2$ of the curvature of the second supporting portion 22, wherein, in the unstressed or unloaded state of the brake shoe 1 (not shown), the preferred relationship of the curvatures is 0.8 to 0.95. Preferably, the brake drum 10 rotates in the clockwise direction relative to the brake shoe 1, i.e. running towards the bearing portion 23 so as to make use of the self-servo effect of the drum brake. The first state of the drum brake is characterized in that an actuation force F is applied at the actuation portion 24, which is smaller than a limiting force $F_G$, so that the brake shoe 1 and in particular the lining unit 4 comes to rest against the brake drum 10 in its first lining portion 41 only. In this context, the limiting force $F_G$ is to be understood as an abstract parameter, which results from the constructive design of the drum brake. It may also be defined as the value of the actuation force F, at which the brake shoe 1 only just rubs against the brake drum 10 in the first lining portion 41 thereof. When there is provided a plurality of lining portions 41, 42, 43 (cf. FIG. 7), there will consequently be a first limiting force $F_G$, up to which only the first lining portion 41 rubs, a second limiting force $F_G$, up to which only the first and the second lining portions 41, 42 rub, and so on. The transition between the lining portions 41, 42 may be stageless in case leaps are to be avoided in the course of the brake force when the actuation force F increases continuously. As is shown in the Figure, the individual lining portions 41, 42 may also be clearly delimited against each other, by means of grooves, cavities or gaps between the lining portions 41, 42, for example.

Figure 2:
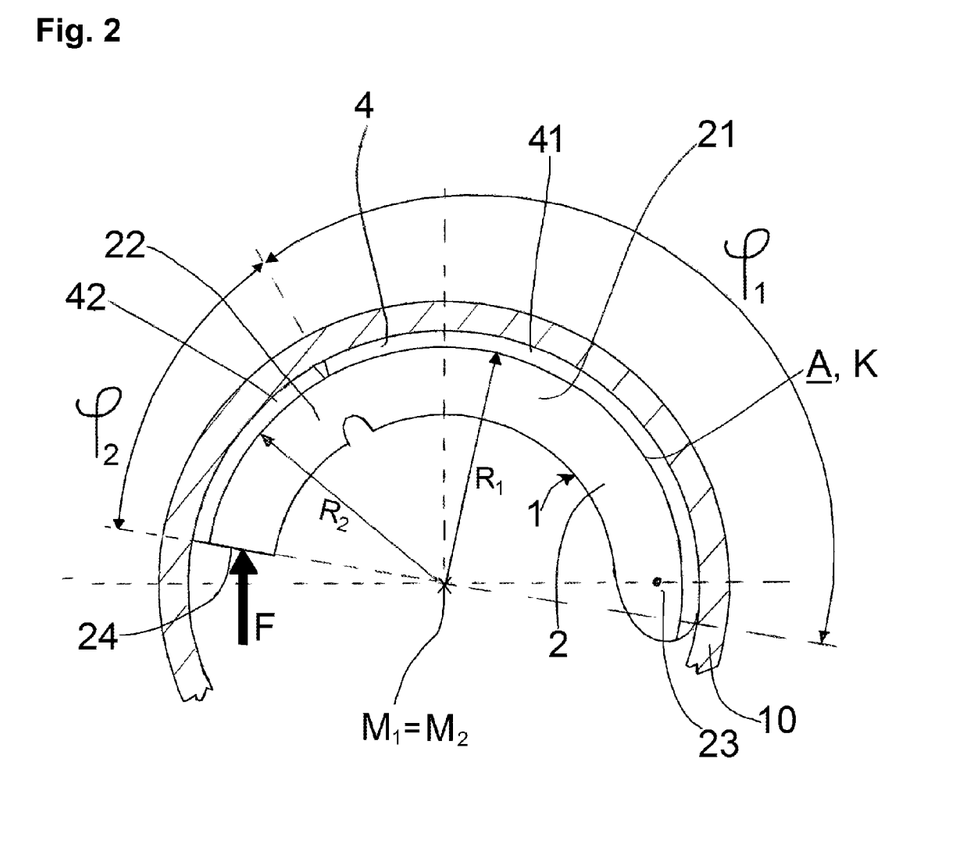
FIG. 2 a view of the drum brake of the invention in its second state.

FIG. 2 shows the drum brake 10 shown in FIG. 1 in its second state. Here, the actuation force F applied at the actuation portion 24 is larger than the limiting force $F_G$, and the supporting unit 2 of the brake shoe 1 is deformed such that the second lining portion 42 is forced or pushed against the inside of the brake drum 10. The deformation of the supporting unit 2 preferably also causes the mean radius of curvature $R_2$ of the curvature of the second supporting portion 22 to be equal to the mean radius of curvature $R_1$ of the first supporting portion 21. Further preferably, in the second state of the drum brake, the centers $M_1$, $M_2$ of the mean curvature of the first and second supporting portions 21, 22 are congruent. To put it differently, as the actuation force increases, the outer contour of the brake shoe 1 more and more adapts to the inner contour of the brake drum 10, wherein the size or magnitude of the friction surface between the lining surface 4 and the brake drum 10 increases.

Figure 3:
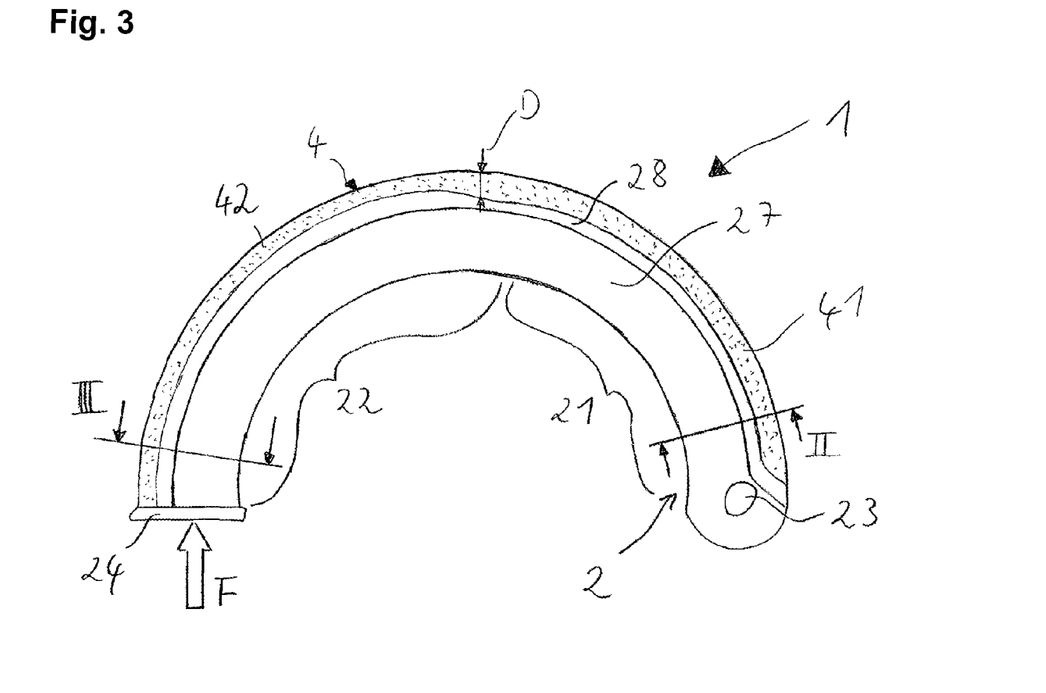
FIG. 3 a side view of a preferred embodiment of the brake shoe of the invention, FIG. 4 a first sectional view of a preferred embodiment of the brake shoe of the invention, FIG. 5 a second sectional view of a preferred embodiment of the brake shoe of the invention, FIG. 6 a view of a preferred embodiment of the actuation portion of the invention, and FIG. 7 a view of a preferred embodiment of the brake shoe of the invention.

The embodiment of the brake shoe 1 of the invention shown in FIG. 3 comprises a supporting unit 2 and a lining unit 4. The supporting unit 2 is preferably designed such that it is arc-shaped or curved, wherein the lining unit 4 is arranged at the convex outer surface of the curvature. The supporting unit 2 comprises a bearing portion 23 and an actuation portion 24, wherein, in the preferred embodiment, which is shown, the bearing portion is a bore, for example, by means of which the supporting unit 2 may be pivotably mounted by means of a pin, for example. Furthermore, the supporting unit 2 comprises a first supporting portion 21 and a second supporting portion 22, wherein the first supporting portion 21 preferably has a lower bending stiffness than the second supporting portion 22. The lining unit 4 preferably in the area of the first supporting portion 21 comprises a first lining portion 41, and in the area of the second supporting portion 22 it comprises a second lining portion 42. Particularly preferably, as is shown, the thickness D of the lining unit in the area of the first lining portion is on average larger than in the area of the second lining portion 42.

Figure 4:
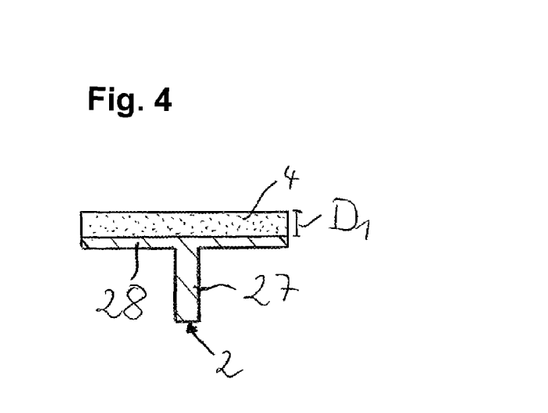

FIG. 4 shows the sectional view indicated by numeral II in FIG. 3 of a preferred embodiment of the brake shoe 1 according to the invention. The T-shaped design of the supporting unit 2, which comprises a lining plate 28 and a web plate 27, is clearly shown. In FIG. 4, the brake shoe is shown as a sectional view in the area of the first lining portion 41 or of the first supporting portion 21, respectively, and the lining unit 4 has a mean thickness $D_1$ in this area. Preferably, the supporting unit 2 may also have a double-T-shaped cross-section, i.e. two parallel web plates 27, or be box-shaped, for example, wherein the web plate 27 is U-shaped and connected to the lining plate 28 with its distal ends.

Figure 5:
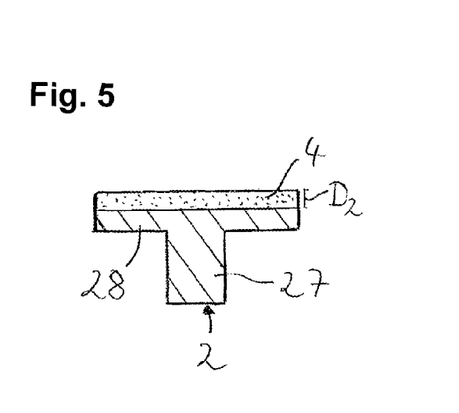

FIG. 5 shows the sectional view of the brake shoe indicated by numeral III in FIG. 3. The lining unit 4 is shown in sectional view in the second lining portion 42 or in the area of the second supporting portion 22, respectively, and has a thickness $D_2$, which is smaller than the thickness $D_1$ of the first lining portion 41 (cf. FIG. 2). Furthermore, it is apparent that the lining plate 28 of the supporting unit 2 in the area of the second supporting portion 22 has a larger thickness or material gauge than the lining plate 28 in the area of the first supporting portion 21. Consequently, the lining plate in the area of the second supporting portion 22 has a greater bending stiffness than the lining plate 28 in the area of the first supporting portion 21. The same applies to the web plate 27, which in the area of the second supporting portion 22, as is shown in FIG. 5, has a greater material gauge or wall gauge or plate thickness than in the area of the first supporting portion 21, as is shown in FIG. 4.

Figure 6:
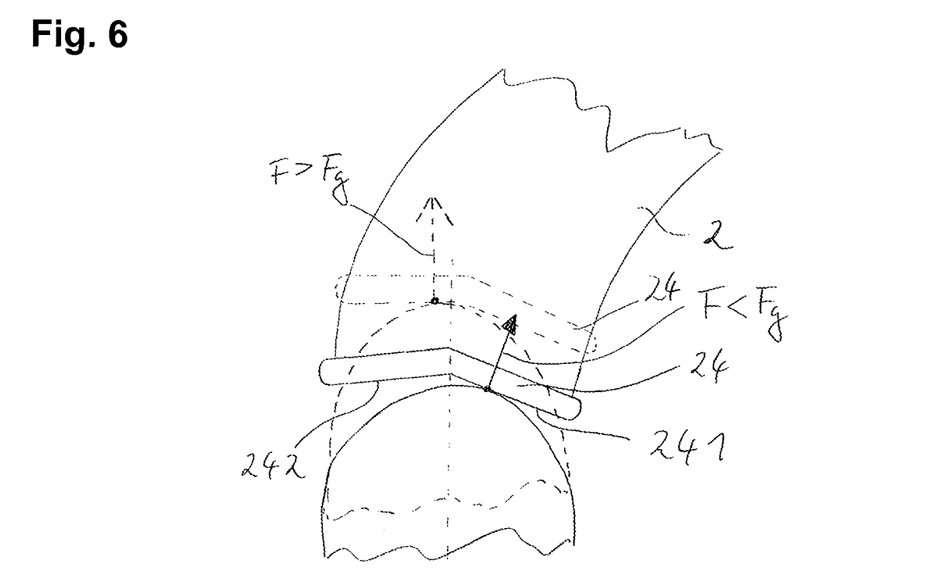

FIG. 6 shows a preferred embodiment of the actuation portion 24. Preferably, the actuation portion 24 has a first engagement portion 241 and a second engagement portion 242, which are each formed two-dimensional or planar and which are pivoted relative to each other. Below the actuation portion 24, there is indicated an actuation element (without reference sign), which transmits an actuation force F to the actuation portion 24. The continuous lines in the Figure show how, in the first state of the drum brake, the actuation element transmits an actuation force F smaller than a limiting to $F_G$ to the first engagement portion 241. It becomes apparent that by diagonally arranging the first engagement portion 241 the resultant force acting on the supporting unit 2 has a force component directed towards the right. The dashed lines in FIG. 6 show the preferred position of the supporting unit 2 in the second state of the drum brake, wherein the actuation element acts on the second engagement portion 242. Preferably, the actuation force F is larger than the limiting force $F_G$, wherein the force actually transmitted to the supporting unit 2 has another main direction than the actuation force transmitted to the supporting unit 2 in the first state of the drum brake. In this preferred embodiment, in the first state, a force is transmitted to the supporting unit 2, which force acts at least in certain areas along the circumferential direction of the supporting unit 2 or the brake drum 10 surrounding said supporting unit 2 (cf. FIGS. 1, 2). Preferably, the first lining portion (not shown in FIG. 6) in the first state of the drum brake is forced against the brake drum with an additional force. As a matter of course, the first engagement portion 241 and the second engagement portion 242 may also be formed rounded, wherein the transition between the two engagement portions may also be formed rounded. Preferably, the actuation portion 24 is adapted to the geometry of the actuation element in order to achieve an optimum transmission of force from the actuation element to the supporting unit 2.

Figure 7:
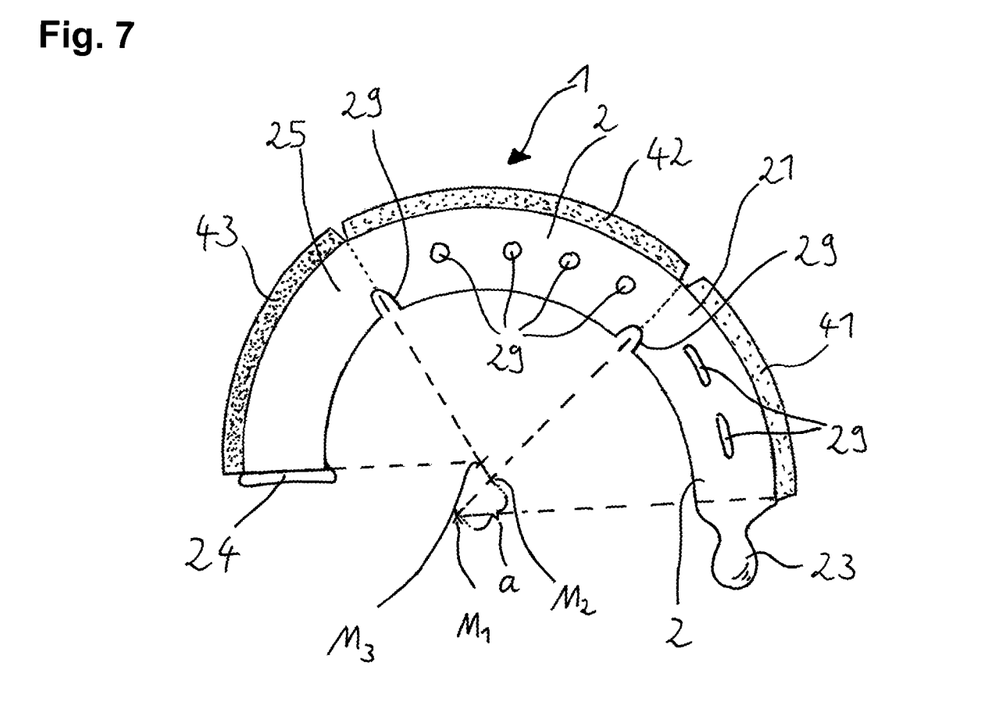

FIG. 7 shows a particularly preferred embodiment of the brake shoe 1 according to the invention. The brake shoe 1 preferably comprises a supporting unit 2 with three supporting portion 21, 22, 25. The supporting portion 21 adjacent to the bearing portion 23 has a mean curvature, the center $M_1$ of which is preferably displaced relative to the centers $M_2$ and $M_3$ of the mean curvatures of the second supporting portion 22 and of the third supporting portion 25. By way of example the distance a of the center $M_1$ from the center $M_2$ is shown, which preferably is in a relationship of 0.01 to 0.2, more preferably 0.05 to 0.1, and particularly preferably 0.07 to 0.09 to the mean radius of curvature of the first supporting portion 21. Furthermore, two of the supporting portions 21, 22, 25 preferably have local material weaknesses 29, which influence the bending stiffness of the supporting unit 2 along the course of curvature between the bearing portion 23 and the actuation portion 24. Preferably, there are provided material weaknesses 29, as recess for example, also in the transitional area between two supporting portions 21, 22, 25 so that the supporting portions 21, 22, 25 may be easier pivoted relative to each other and it is possible to achieve that the brake shoe 1 rests optimally against the brake drum 10 (not shown) during different operational states of the brake. FIG. 7 shows also the preferred design of the lining portions 41, 42, 43, wherein they are made from different materials. Advantageously, the first lining portion 41 has a higher abrasion resistance than the second lining portion 42 and the third lining portion 43, wherein the third lining portion 43 in turn has the highest coefficient of friction of the lining portions 41, 42, 43. Thus, the brake and wear behavior of the brake shoe 1 for certain expected times of stress of the individual lining portions 41, 42, 43 may be optimized during operation and for the required brake forces. In the embodiment shown, all lining portions 41, 42, 43 have the same thickness. Alternatively, it could be preferred that the thickness $D_1$ of the first lining portion 41 is larger than the thickness $D_2$ of the second lining portion 42, and the latter in turn is larger than the thickness $D_3$ of the third lining portion 43.

LIST OF REFERENCE SIGNS

2—supporting unit
4—lining unit
10—brake drum
21—first supporting portion
22—second supporting portion
23—bearing portion
24—actuation portion
25—third supporting portion
27—web plate
28—lining plate
29—material weakness
41—first lining portion
42—second lining portion
43—third lining portion
241—first engagement portion
242—second engagement portion
D—thickness of the lining unit
A—outer surface of the supporting unit
a—distance
$D_1$—first thickness
$D_2$—second thickness
F—actuation force
$F_G$—limiting force
K—line of curvature
$M_1$, $M_2$, $M_3$—center of the mean curvature
R—direction of rotation
$\phi_1$, $\phi_2$—first, second angle of the arc

The invention claimed is:

1. A brake shoe for a drum brake, comprising:
a supporting unit which comprises a bearing portion for pivotable support and an actuation portion; and
a lining unit fixed at a convexly curved outer side of the supporting unit, wherein, when an actuation force smaller than a limiting force is applied to the actuation portion, the lining unit shows a braking effect in a first lining portion only, wherein, when an actuation force larger than the limiting force is applied, the lining unit shows a braking effect also in a second lining portion, and wherein a majority of the first lining portion is located adjacent one of the bearing portion and the actuation portion of the supporting unit, and a majority of the second lining portion is located adjacent the other of the bearing portion and the actuation portion of the supporting unit;
wherein the supporting unit between the bearing portion and the actuation portion comprises a curved first supporting portion, and a curved second supporting portion; and
wherein a center of a mean curvature of the first supporting portion at the convexly curved outer side is spaced apart from a center of a mean curvature of the second supporting portion at the convexly curved outer side.

2. The brake shoe of claim 1, wherein the distance of the centers relative to each other is in a relationship of within a range of from about 0.01 to about 0.15 to a mean radius of curvature of the first supporting portion.

3. The brake shoe of claim 2, wherein the distance of the centers relative 3 each other is in the ratio of within the range of 0.03 to 0.1 to the mean radius of the first supporting portion.

4. The brake shoe of claim 3, wherein the distance of the centers relative to each other is in the ratio of within the range of 0.05 to 0.07 to the mean radius of the first supporting portion.

5. The brake shoe of claim 1, wherein the first supporting portion spans a first angle of arc about the center of the mean curvature of the first supporting portion, wherein the second supporting portion spans a second angle of arc about the center of the mean curvature of the second supporting portion, and wherein the ratio of the first angle to the second angle of arc is in a range of from about 0.5 to about 3.

6. The brake shoe of claim 5, wherein the ratio of the first angle of arc to the second angle of arc is in the range of 0.7 to 2.

7. The brake shoe of claim 6, wherein the ratio of the first angle of arc to the second angle of arc is in the range of 0.9 to 1.3.

8. The brake shoe of claim 1, wherein in a decompressed state of the brake shoe a mean radius of curvature of the first supporting portion to a mean radius of curvature of the second supporting portion is in a ratio within a range of from about 0.8 to about 0.99.

9. The brake shoe of claim 8, wherein the ratio of the mean radius of curvature of the first supporting unit to the mean radius of curvature of the second supporting unit is within the range of 0.85 to 0.95.

10. The brake shoe of claim 9, wherein the ratio of the mean radius of curvature of the first supporting unit to the mean radius of curvature of the second supporting unit is within the range of 0.88 to 0.92.

11. The brake shoe of claim 5, wherein the first lining portion has a first thickness and the second lining portion has a second thickness, and wherein the first thickness is in a relationship of within a range of about 1.05 to about 4 to the second thickness.

12. The brake shoe of claim 11, wherein the relationship of the first thickness to the second thickness is within the range of 1.2 to 2.

13. The brake shoe of claim 12, wherein the relationship of the first thickness to the second thickness is 1.5.

14. The brake shoe of claim 1, wherein the supporting unit comprises at least one material weakness, which reduces the bending stiffness of the supporting unit.

15. The brake shoe for a drum brake of claim 1, wherein the majority of the first lining portion is located proximate the bearing portion of the supporting unit.

16. A brake shoe for a drum brake, comprising:
a supporting unit which comprises a bearing portion for pivotable support and an actuation portion; and
a lining unit fixed at a convexly curved outer side of the supporting unit, wherein, when an actuation force smaller than a limiting force is applied to the actuation portion, the lining unit shows a braking effect in a first lining portion only, wherein, when an actuation force larger than the limiting force is applied, the lining unit shows a braking effect also in a second lining portion, and wherein a majority of the first lining portion is located adjacent one of the bearing portion and the actuation portion of the supporting unit, and a majority of the second lining portion is located adjacent the other of the bearing portion and the actuation portion of the supporting unit;

wherein the supporting unit between the bearing portion and the actuation portion comprises a curved first supporting portion, and a curved second supporting portion; and wherein a center of a mean curvature of the first supporting portion at the convexly curved outer side is spaced apart from a center of a mean curvature of the second supporting portion at the convexly curved outer side, and wherein the first lining portion comprises a material having a greater abrasion resistance than the second lining portion.

17. A brake shoe for a drum brake, comprising:
a supporting unit which comprises a bearing portion for pivotable support and an actuation portion; and
a lining unit fixed at a convexly curved outer side of the supporting unit, wherein, when an actuation force smaller than a limiting force is applied to the actuation portion, the lining unit shows a braking effect in a first lining portion only, wherein, when an actuation force larger than the limiting force is applied, the lining unit shows a braking effect also in a second lining portion, and wherein a majority of the first lining portion is located adjacent one of the bearing portion and the actuation portion of the supporting unit, and a majority of the second lining portion is located adjacent the other of the bearing portion and the actuation portion of the supporting unit;

wherein the supporting unit between the bearing portion and the actuation portion comprises a curved first supporting portion, and a curved second supporting portion; and wherein a center of a mean curvature of the first supporting portion at the convexly curved outer side is spaced apart from a center of a mean curvature of the second supporting portion at the convexly curved outer side, and, wherein a coefficient of friction of the second lining portion is within the range of from about 1.1 to about 3 times a coefficient of friction of the first lining portion.

18. The brake shoe of claim 17, wherein the relationship of the coefficient of friction of the second lining portion to the coefficient of friction of the first lining portion is within the range of 1.15 to 2.

19. The brake shoe of claim 18, wherein the relationship of the coefficient of friction of the second lining portion to the coefficient of friction of the first lining portion is within the range of 1.3 to 1.7.

* * * * *

UNITED STATES PATENT AND TRADEMARK OFFICE
CERTIFICATE OF CORRECTION

PATENT NO. : 9,702,422 B2  
APPLICATION NO. : 14/160064  
DATED : July 11, 2017  
INVENTOR(S) : Wallmeier et al.

Page 1 of 1

It is certified that error appears in the above-identified patent and that said Letters Patent is hereby corrected as shown below:

In the Specification

Column 2, Line 42:
"parameters" should be — parameter's —

Column 10, Lines 64-65:
After "limiting" insert -- force --

Column 11, Line 27:
"portion" (1st occurrence) should be — portions —

In the Claims

Column 12, Claim 3, Line 58:
"3" should be — to —

Column 12, Claim 5, Line 67:
"," should be — ; —

Column 13, Claim 5, Line 3:
"," should be — ; —

Column 14, Claim 16, Line 11:
"," should be — ; —

Column 14, Claim 17, Line 35:
Delete "and"

Column 14, Claim 17, Lines 39-40:
"side, and," should be — side; and —

Signed and Sealed this
Twenty-ninth Day of May, 2018

Andrei Iancu
*Director of the United States Patent and Trademark Office*